United States Patent [19]

Gaubert et al.

[11] Patent Number: 5,650,188

[45] Date of Patent: Jul. 22, 1997

[54] BAKING IMPROVER COMPOSITIONS

[75] Inventors: Henri Gaubert, Valenciennes; Dominique Le Cren, Paris; Jaques Perrier, Wallers, all of France

[73] Assignee: Gist-brocades, B.V., Ma Delft, Netherlands

[21] Appl. No.: 332,413

[22] Filed: Oct. 28, 1994

[30] Foreign Application Priority Data

Oct. 29, 1993 [FR] France ..................... 93 12935
Feb. 25, 1994 [EP] European Pat. Off. ............. 94200457

[51] Int. Cl.$^6$ ..................... A21D 2/32; A21D 2/00
[52] U.S. Cl. ..................... 426/549; 426/454; 426/654; 426/496; 426/573; 426/662
[58] Field of Search ..................... 426/27, 61, 549, 426/573, 454, 496, 654, 662

[56] References Cited

U.S. PATENT DOCUMENTS

| | | |
|---|---|---|
| 1,776,721 | 9/1930 | Bollmann . |
| 3,615,645 | 10/1971 | Forkner ..................... 426/573 |
| 3,753,732 | 8/1973 | Boroshok ..................... 99/1 |
| 4,624,856 | 11/1986 | Vanderveer et al. ..................... 426/549 |
| 4,748,027 | 5/1988 | Schou et al. ..................... 426/549 |
| 4,762,658 | 8/1988 | Rothfuss et al. ..................... 264/122 |
| 4,990,343 | 2/1991 | Haarasilta et al. ..................... 426/61 |

FOREIGN PATENT DOCUMENTS

| | | |
|---|---|---|
| 0072469 | 2/1983 | European Pat. Off. . |
| 072 469 | 2/1983 | European Pat. Off. . |
| 238 766 | 9/1987 | European Pat. Off. . |
| 354 442 | 2/1990 | European Pat. Off. . |
| 421 510 | 4/1991 | European Pat. Off. . |
| 619947 | 10/1994 | European Pat. Off. . |
| 2 590 448 | 5/1987 | France . |
| 25 30 164 | 5/1976 | Germany . |
| 588 354 | 5/1947 | United Kingdom . |

*Primary Examiner*—Jeanette Hunter
*Attorney, Agent, or Firm*—Morrison & Foerster LLP

[57] ABSTRACT

A baking improver composition in a homogeneous solid shaped form which includes one or more baking improver agents and at least one binding agent which permits disintegration of the solid form when in use for mixing a dough. Such a composition form may weigh between 25 grams and 2 kilograms and is capable of manual division into smaller dosage units and obtained, for example, by compacting a powder composition based on flour and containing about 20 to 30% by weight of lecithin as a binding agent and baking emulsifier.

13 Claims, No Drawings

BAKING IMPROVER COMPOSITIONS

The invention relates to baking improver compositions in a homogeneous solid shaped form and processes for the production of such formulations.

It is generally accepted to add baking improvers to wheat flour of the type used in baking or in biscuit-making, in particular one or more compounds selected from ascorbic acid, food enzymes, gluten and starch or lecithin, as emulsifying agent, with a view to improving the performance of the flour, e.g. the aptitude of the wheat flour to dispersion and humidification, and the characteristics of the dough and the final baked product. Such characteristics include, for example, increasing the oven spring, provision of a crust having a particularly appetizing appearance and improvement of the bread crumb softness.

Processes for the production of baking aids in powder form have previously been described, for example, in French Patent no. 2,590,448-B1 filed by Jean Griveau, the title of which is "Process for the preparation of a pulverulent mixture of wheat flour and lecithin".

These pulverulent mixtures are generally provided in sacks of various capacities and are measured out with the aid of volumetric metering devices in amounts in the region of 500 grams per 100 kg of flour. Such compositions have several disadvantages:

powder formulations have the tendency to form dust during scaling or dosing which may cause allergies in people that handle the products or cause problems with cleaning the equipment or the production area used;

the measuring is inaccurate, especially since some products may be very concentrated, 25 kg sacks, the most frequently sold are bulky to store, once opened, the sack does not make it possible to preserve the mixture under very hygienic conditions, as a consequence, the shelf like is limited to 9 months.

It is for these reasons that it was first envisaged to create measured units in sachets which are soluble in methyl ethyl cellulose. The state of the art did not make it possible to envisage any other material for the preparation of these sachets; however, they were banned in some countries by the legislation relating to food products.

EP 421510 describes a mixture of fat and bread improver ingredient which is dispersed in liquid glyceride oil. This pumpable formulation has the severe disadvantage that only fat containing improvers can be obtained. Moreover, the legislation of some countries does not allow fat in bread improvers.

The use of small concentrated solid forms of bread additives in the shape of tablets is also common practice. Serious disadvantages of such formulations are (i) it is not possible to easily subdivide the dosage in an easy and flexible way and (ii) it is not practical to dose at more than a few percent of the total bread formulation thereby restricting use to minor additives.

It has therefore not previously been known how to agglomerate a baking improver composition with a low fat content of 40% w/w or less so as to form compact blocks. Lecithin, the only baking emulsifier authorised in some countries, is not able to act as an emulsifier for this purpose under the known conditions of use for production processes.

The aim of the present invention is to overcome the above disadvantages. In one aspect, the invention provides a baking improver composition in a homogeneous solid shaped form which comprises one or more baking improver agents and includes at least one binding agent, e.g. a fat or a fat-related compound such as an emulsifier, which permits disintegration of the solid form when in use for mixing of a dough. In particular, for example, a mixture based on wheat flour and lecithin may be compacted into a solid shaped form, e.g. a block, wherein the lecithin functions as the binding agent and is also a baking emulsifier.

By the term binding agent is meant any ingredient that may be used to form or improve the structure, texture or consistency of the final solid form. As a binding agent one may choose any structure forming component. As non-limiting examples one may consider, in addition to lecithin, fats e.g. phospholipids, fat hydrolysis products and their esters and ethers, other emulsifiers, water with hydrocolloids like gelatin, pectin, guar, alginates, locust bean gum, gellan gum, xanthan, furcellaran, carrageenans, carboxymethyl cellulose, modified or native starch, in combination with any salt or other additive required for gelation, proteins from milk, gluten and soy, low amounts of water, dextrins and sugars, alone or in combination.

A product of the present invention may be in a variety of homogeneous-compact solid shaped forms such as blocks, spheres, pearls, threads and sausages. Such a formulation may be pre-cut and pre-measured into dosage units for mixing of a dough, is easy to use, easily stored, hygienic as it is easily wrapped, and may be preserved for a long period.

A formulation of the present invention may have a considerable, but handy size. It may contain a substantial part of the total baked product formulation and may be dosed flexibly and continuously in a similar manner to fresh compressed yeast blocks.

The formation of a mixture of ingredients into a solid shape to provide a formulation of the present invention may be achieved by a number of techniques. To present practical examples but by no means limiting the possibilities, one may contemplate the formation of solid shaped formulations of the present invention in the below described ways.

Thus, in a further aspect the present invention provides a process for preparing a baking improver composition in a form according to the invention which comprises compacting a mixture of the ingredients to provide the desired solid shaped form, e.g. at a pressure of 100 bars ($10^4$ kPa) or more. Such a method is suitable for preparing a variety of baking improver formulations including preferred formulations of the invention based on wheat flour and lecithin.

According to a preferred compacting formulation method of the invention, agglomeration of a mixture of the ingredients is achieved by pressing the mixture into a mould.

Thus, the desired solid form may be formed by pressing a mixture of the ingredients, e.g. in the form of a powder, into a mould with sufficient force to make them stick together. Finer powders are preferred for this purpose since they are more readily compacted. Inclusion of a fat or fat-related compound as the binding agent in an amount from 1 to 95% by weight (preferably 2 to 75%, more preferably 3 to 50% and even more preferably 5 to 30% by weight) in a dry powder composition has been found to be a good way of achieving a stable solid form after pressing. Also a liquid component like water or oil may be included.

According to another preferred compacting formulation method of the invention, agglomeration of the composition components is achieved using an extruder. At the outlet of the extruder, a cutter may cut the extruded compacted composition into blocks of a desired dosage unit size.

Alternatively, the present invention provides a process for preparing a baking improver composition in a form according to the invention which comprises making a liquid mixture of the ingredients and subsequently cooling to below the melting point or gelling point of the binding agent.

Thus, in a further preferred embodiment of the invention ingredients for a baking improver composition are dissolved in a fat or water, if necessary following heating. The formed composition is then cooled to the solid form. When water is employed, suitable gel forming compounds like gums, proteins or starches can be added to help form the desired solid shaped form. Water containing a mixture of one or more of the above mentioned components may be used.

The advantage of such a formulation is that it does not require any fatty component for forming and retaining its shape. In addition, no strong pressing force is required during manufacture.

Any suitable gel forming component may be used to achieve a solid form. Random examples by no means forming a limiting list are alginate with calcium salts, kappa carrageenan with calcium or potassium salts, xanthan gum with locust bean gum, agar-agar, furcellaran, gelatin, low methoxyl pectin with calcium salts, high methoxyl pectin in a high solids formulation, protein, denatured or gelled with other components, pregelatinized starch or mixtures thereof. Preferably a gel network is used that after formation is still dissolvable in water or that will melt at the elevated temperatures that are reached during mixing of a dough.

As a suggested practical method, one could, for example, add the gelling agent in aqueous solution to the other components in a dry premix. Heating a mixture containing water and starch in addition to one or more baking improver components to a temperature above the gelatinization temperature of the starch used will also result in a solid form on cooling because of the starch network formed.

A mixture of a melted fat or fat-related material (for example an emulsifier or fat hydrolysis product or ester or ether thereof) and one or more of the above mentioned baking improver components may be cooled. The amount of fat or fat-related component must be sufficiently high to form the continuous phase between the other component or components. The amount of fat or fat-related material required will vary with the characteristics of the total composition but will not need to exceed 95% by weight. On cooling, the fat or fat-related material will crystallize to form a continuous solid phase holding the solid shape together. By keeping the melting point of the fat or fat-related material below or at the maximal dough temperature attained during mixing, one can achieve disintegration of the solid form and release of the active components into the dough during mixing. By choosing the melting temperature of the binding agent one may also achieve an optimal balance between a moderate heating step and not too cold storage and easy liberation of active components. The advantage of this formulation is that a strong pressing force is not needed for making the solid shaped form and the formulation may be stored at ambient temperatures.

It is an important required feature of the solid shaped form that it should fall apart with ease during mixing of the dough. In application of the above-described formulation methods of the invention, this can be readily achieved by adjusting the compaction pressure, melting temperature or gelling component as appropriate.

A mixture of an edible oil or liquid fat-related material, (e.g. a lipid, emulsifier, fat hydrolysis products or ester or ether thereof) and one or more of the above mentioned baking improver components may be cooled to a temperature below which the major part of the oil or fat-related material has crystallized. The amount of solid fatty component at that point must be sufficient to form the continuous phase between the other component or components. The amount of fatty material required will vary with the characteristics of the total composition but will not need to exceed 95% by weight. The advantage with this method is that none of the ingredients needs to be exposed to a high temperature. This is an advantage when using components like food enzymes or unstable esters such as the often used diacetyl tartaric ester derivatives of monoglycerides and unstable or volatile flavours.

Combinations of the above mentioned techniques may be used which may give additional advantages.

A formulation of the present invention may contain in addition to one or more baking improvement additives and one or more binding agents a filler. By the term filler is meant any ingredient in the formulation that has as its main function provision of volume at a low cost. On top of these requirements, different fillers will have different effects on the final product consistency and its ease of manufacture. Commonly used fillers include flours like cereal and leguminous flours and their fractions, optionally toasted, malt flours, calcium salts like calcium carbonate and calcium phosphate, sodium salts like sodium chloride and sodium phosphate and other common salts. Other materials may also be employed which constitute a low cost bulky ingredient.

When compacting a mixture of ingredients to form a baking improver formulation of the present invention, desirably this should not be carried out in such a way that tablets are formed, as these are not easily divided making it impossible to dose continuously and/or in a flexible way. To comply with the need for flexible dosing, tablets need to be small or have been designed to break into distinct fractions. The present invention provides baking improver compositions in larger solid shaped forms which are easily divided manually and thus allow flexible dosing much like using fresh compressed yeast.

Thus, formulations of the present invention may be desirably of a sufficient size that they may be used either in whole blocks or after division into smaller dosage units allowing the dosage to be adjusted exactly to the requirements of the dough. Such flexible and precise dosing is important to a baker in cutting costs and preventing over or under dosing of active ingredients.

A solid shaped formulation of the present invention may have a weight of, for example, about 10 grams to 5 kg, preferably 25 grams to 2 kg, more preferably 50 to 1000 grams.

To mimic the ease of use of compressed yeast, one must adjust the formulation in a way that the crumbliness is sufficient for manual division by gentle pulling or bending by the fingers, but the formulation is strong enough not to fall apart during packaging and transport.

In general, tablets can be used for addition of a few ingredients which are difficult to dose like enzymes and ascorbic acid. The present invention also permits the addition of higher dose ingredients like an emulsifier or even allows the addition of a larger part of the dough formulation as is common practice with concentrated bread mixes. Tablets are produced only by pressing powders forcefully into a mould. This production procedure presents problems when incorporating recrystallisable components like diactyl tartaric ester derivatives of monoglycerides as these will tend to form strong structures on compressing that will not fall apart easily during the mixing of the dough.

As hereinbefore indicated, a formulation of the invention containing as the binding agent an oil, fat of fat-related material will generally contain from 1 to 95% by weight, or binding agent, e.g. 2 to 75% by weight, preferably 3 to 50% by weight. More preferably, the percentage weight of such a binding agent will be 40% by weight or lower, e.g. about 5 to 30% by weight.

In the case of lecithin, the proportion employed will preferably vary within the range about 20 to 30% by weight. The amount chosen will depend on the qualities of the pulverulent material to be combined with lecithin and the need not to compromise the functional capability of the lecithin as an agglomeration emulsifier. Below 20% by weight of lecithin, compaction is difficult. Above 30% by weight of lecithin, it exudes from the compacted preparation.

When water is used, the formulation will generally contain 3 to 90%, preferably 5 to 75%, even more preferably 5 to 50% by weight of water.

In a solid shaped formulation of the invention any additive that one wishes to add to a dough can be incorporated, even parts or all of a major ingredient like flour, fat or sugar. Ingredients commonly used as baking improving agents which may be employed include, in addition to ascorbic acid, lecithin and gluten and starch as already mentioned above, fats and related compounds, other emulsifiers, organic acids like acetic, fumaric, citric, tartaric and lactic acid, baking powders, salt, yeasts, lactic acid bacteria, sour dough components, fermentation juices, milk constituents, soy flour components, (roasted) malt flour, sugars, flavours, colours and food enzymes like amylases, xylanases, glucanases, lipases, proteases and oxidases.

The invention is illustrated by means of the following examples.

EXAMPLE 1

Formation of a Food Meal/Lecithin Composition

The food meal (75% by weight) is first of all introduced into a mixer. The mixer turbine is brought to the mixing speed, preferably from 300 to 400 revolutions/minute, and the interior of the mixer is brought to a temperature of $0°\pm5°$ C. The lecithin (25% by weight) is also brought to a temperature of $0°\pm5°$ C. and added to the mixer. The mixing time for the food meal and lecithin in the mixer is preferably less than 10 seconds.

Agglomeration of the resulting mixture is preferably carried out at a pressure of at least 100 bars ($10^4$ kPa) by pressing in a mould or by using an extruder.

EXAMPLE 2

Formation of Wheat Flour/Lecithin Compositions on an Industrial Scale

The first stage of the process is preparation of a wheat flour/lecithin mixture in accordance with the process of French Patent no. 2,590,448-B1, filed by Jean Griveau. The proportions of flour and lecithin, the temperature conditions, the mixer internal volume, the spin speed of the mixer turbine and the mixing time are chosen so as to make agglomeration of the products possible.

The second stage is achieved in one of two ways:

1. The wheat flour/lecithin mixture is placed in moulds and subjected to a press which exerts a minimum pressure of 100 bars ($10^4$ kPa).
2. The wheat flour/lecithin mixture is directed into an extruder which both subjects the mixture to pressure to achieve agglomeration and extrudes it through a suitably shaped mould.

In the first stage, the lecithin, which is contained in barrels, is brought to a temperature between $-5°$ and $+5°$ C. This can be achieved by storage for a sufficient period (in general of the order of at least 24 hours) in a cold room. A lower temperature may be used, but the energy expenditure required would not be justified by any substantial improvement in the formulation process.

The contents of the lecithin barrels are tipped into a storage tank, from which the lecithin is withdrawn by pumping and pushed towards a metering vat of 250 kg capacity. This vat is fitted with a butterfly valve having an aperture diameter of 300 mm supply a turbomixer. The aperture diameter of the metering vat butterfly valve is chosen so that the time required for complete emptying of lecithin from the metering vat into the turbomixer is slightly less than 10 seconds.

750 kg of bread-making wheat flour of the type known as "55" is firstly introduced into the turbomixer by means of a pneumatic conveying device and a weighing skip. The mixer turbine speed is regulated to approximately 400 revolutions/minute. A greater speed, although possible, would consume more energy without notably improving the process. When the desired mixing speed is reached, the valve of the metering vat is opened and the entire quantity of lecithin contained in the metering vat is allowed to flow by gravity into the mixer. As soon as the flow of lecithin is finished, the speed of the turbine is reduced and the mixture of lecithin and flour (the total weight of which is 1000 kg) is drained out by allowing it to flow, under the effect of rotation of the turbine, through an outlet valve positioned in the lower part of the mixer into a storage tank. The aperture of the mixer outlet valve is regulated so that the flow time for the total mixture is not greater than 10 seconds. A semi-worked product is thus obtained which is conveyed, e.g. by vacuum or by conveyor, from the intermediate storage tank to the device for the implementation of the second stage of the process.

The conventional step of sieving in a flour sifter is no longer necessary since, among other reasons, the product is intended for compaction.

The given proportions of 25% by weight of lecithin for 75% by weight of flour are those which may be used for baking aids based on flour and do not imply any limitation.

When pressing in moulds is to be carried out, the device for implementing the second stage is a machine which carries out filling of the moulds with mixture which has been conveyed to its reservoir by a vacuum shaft, conveyor or other means. Once filled, the moulds are levelled off and then transported by a conveyor to a press, which is capable of achieving moulding at an approximate pressure of 100 bars ($10^4$ kPa). The resulting compacted blocks are removed from the moulds by a prehensile suction-type stripper. The moulds are cleaned and returned on a circuit in order to be refilled with the mixture.

The compacted blocks may optionally be cut up into smaller dosage units. The blocks obtained are then directed by a conveyor to a packing or a bagging machine.

Alternatively for the second stage, a device is employed containing an extruder whose Archimedean screw takes up the mixture which has been conveyed to its reservoir. The pitch of the screw thread and the mould at the extruder outlet are designed in such a way that the pressure at the mould inlet is in the region of 100 bars ($10^4$ kPa).

At the extruder outlet, the extruded strip, whose section is determined by the shape of the mould, is directed towards a cutter. The cutting frequency of the cutter is selected to obtain blocks of the desired length, taking into account the extrusion speed of the extruded strip. The blocks thus cut are subsequently directed by a conveyor to a packing or a bagging machine.

Instead of wheat flour, a mixture of wheat flour and one or more baking improving agents such as ascorbic acid and food enzymes may be employed in the same process. A composition is thus obtained consisting mainly or entirely of wheat flour and lecithin in the form of compact blocks of pre-determined dosage size, which are much easier to handle, which are more concentrated since their density is greater, and which may be preserved for up to 25 to 50% longer than conventional wheat flour/lecithin powder mixtures.

We claim:

1. A baking composition which comprises one or more baking improver agents and at least one binding agent which is present at 40% by weight or less and which permits disintegration of the solid form when in use for mixing of a dough wherein said baking composition is a homogeneous solid shaped form, weighs between 25 grams and 2 kilograms and has a crumbliness that is sufficient for manual division by gently pulling or bending by the finger but is strong enough not to fall apart during packaging or shipping.

2. The composition of claim 1 wherein said binding agent is selected from the group consisting of an edible oil, a fat, an emulsifier, fat hydrolysis products and esters and ethers thereof, water and combinations thereof.

3. The composition of claim 1 wherein said binding agent is a gel derived from an aqueous solution of a gel-forming material.

4. The baking composition of claim 1 wherein said composition weighs between 50 and 1000 grams.

5. The composition of claim 2 wherein the percentage of said binding agent is 40% by weight or less.

6. The composition of claim 4 wherein said binding agent is about 5 to 30% by weight.

7. The composition of claim 1 wherein said binding agent and said baking improver agent comprises lecithin at a concentration of about 20 to 30% by weight.

8. The composition of claim 1 which further contains a filler material.

9. The composition of claim 8 wherein said filler material comprises a material selected from the group consisting of flour, starch and calcium and sodium salts.

10. The composition of claim 9 wherein the filler material comprises flour.

11. The composition of claim 10 wherein the binding agent comprises lecithin.

12. The composition of claim 11 wherein the percentage of lecithin is about 20 to 30% by weight and the percentage flour or flour in combination with one or more baking improver agents is about 70 to 80% by weight.

13. The composition of claim 1 in a form capable of manual division into smaller dosage units.

* * * * *